United States Patent

[11] 3,560,692

[72] Inventor Franklin S. Briles
 6 Middleridge Road North, Rolling Hills, Calif. 90274
[21] Appl. No. 720,698
[22] Filed Apr. 11, 1968
[45] Patented Feb. 2, 1971

[54] INDUCTION-HEATING APPARATUS FOR COLD HEADER
 3 Claims, 7 Drawing Figs.
[52] U.S. Cl.................................................... 219/7.5,
 12/10, 219/10.79
[51] Int. Cl....................................................... H05b 5/10
[50] Field of Search........................................... 29/10;
 10/26, 27, 12; 219/10.61, 10.79, 7.5, 150

[56] References Cited
UNITED STATES PATENTS
2,139,936 12/1938 Clouse.......................... 12/10T
2,881,297 4/1959 Freidman..................... 219/10.79X Primary Examiner—J. V. Truhe
Assistant Examiner—Hugh D. Jaeger
Attorney—Albert L. Gabriel ABSTRACT: An induction-heating unit of elongated tubular form for guiding rod or wire stock to a remote, generally inaccessible region and heating the stock when it reaches such remote location. The induction unit includes an elongated tubular body for carrying the high frequency induction current and guiding the rod or wire stock to a forward tubular induction head wherein the stock is heated as it passes therethrough, the body including a pair of concentric tubular conducting cases along which the respective induction heater conductors are affixed, the cases being separated by insulation material and the inner case having a tubular core of insulation material through which the stock is guided. This induction-heating unit has particular utility combined with a cold header for heating the stock within the cutoff quill to adapt a cold header for hot cutoff and heading.

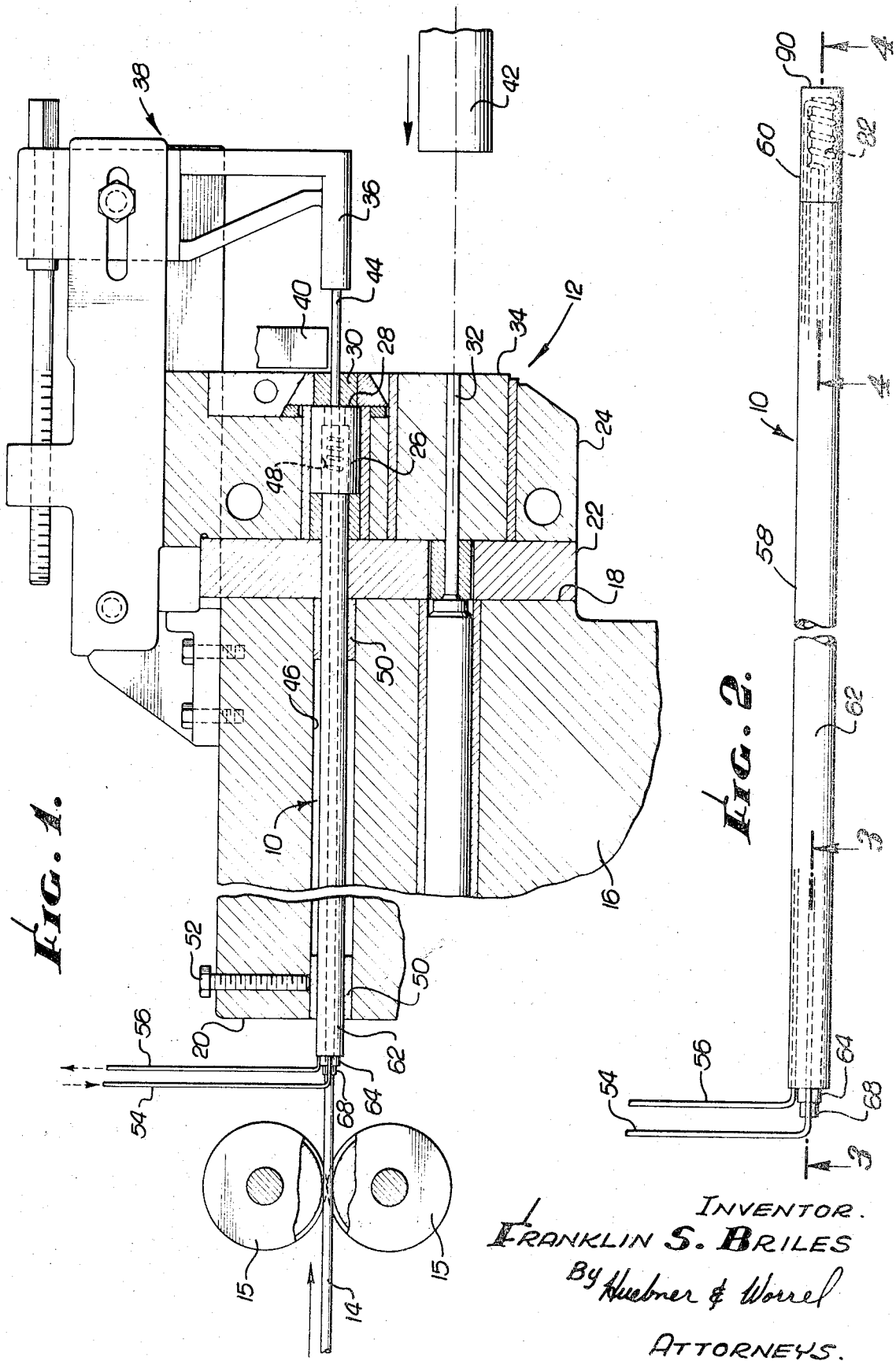

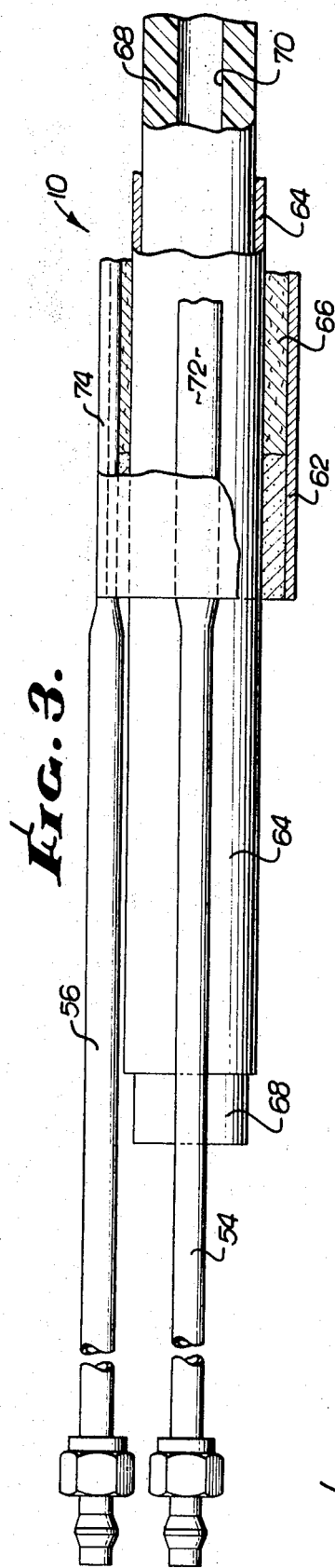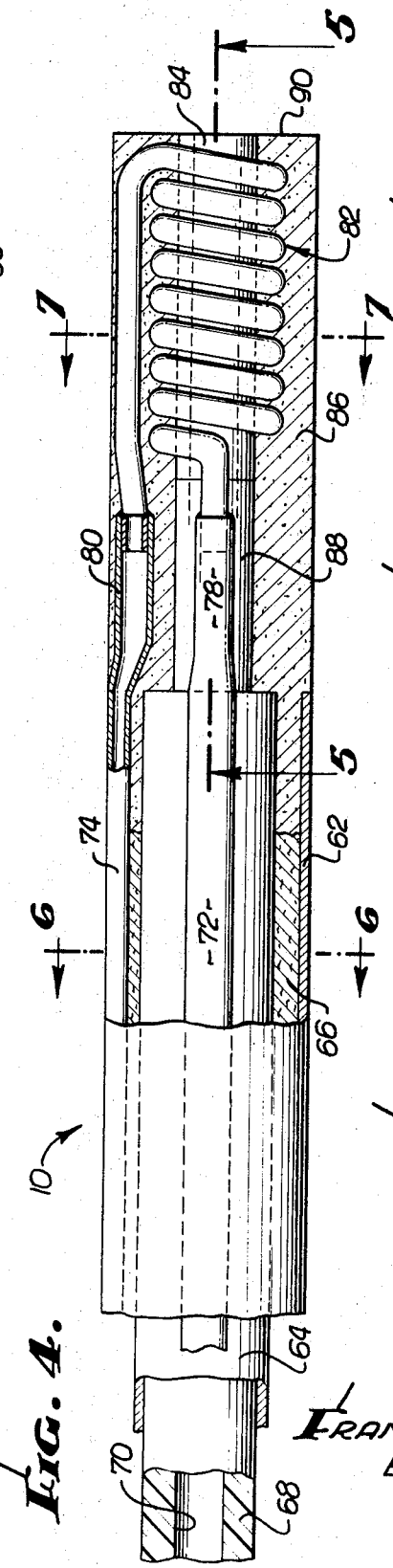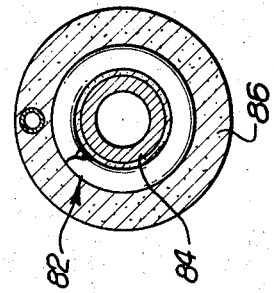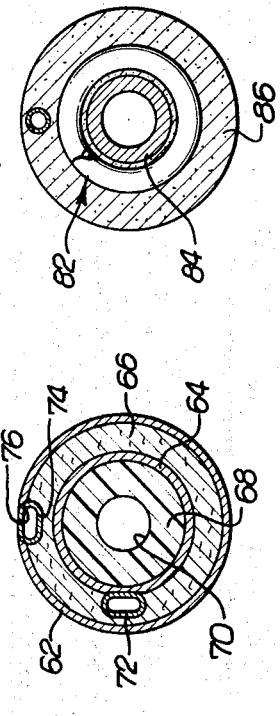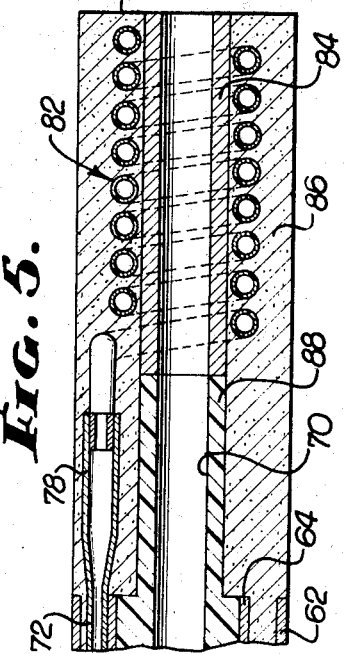

INDUCTION-HEATING APPARATUS FOR COLD HEADER

BACKGROUND OF THE INVENTION

Cutting and heading of rivet and bolt blanks has heretofore conventionally been rapidly performed in apparatus called a cold header, wherein rod or wire stock is fed through a passage in the base or body of the header by feed rolls located at the rear, and thence through a cutoff quill or die at the front of the header, at which point the blank is cut off of the front end of the stock by means of a cutoff knife, and is then moved by fingers into alignment with a header die and is hit and upset by a ram or gate to form a head on the blank. This entire operation has historically been performed with the rod or wire stock in a cold condition but with the advent of the some of the very tough, modern metals and alloys, it has been found that some of these materials cannot be thus conventionally cut off and headed in a cold header, but require special procedures for cutting off the blank, and require heating in order to be sufficiently malleable for heading.

Thus, for example, it has recently become common practice when working with stock of a material such as 6—4 titanium to produce headed rivet or bolt blanks by first cutting off the blank cold on a screw machine, which is a difficult and slow procedure to accomplish, and then heat the slugs by passing them through an open induction coil and head the slugs immediately thereafter, while they are still hot, on a cold header.

A major problem in such prior art procedure was that a certain slug length first had to be developed for a particular heading run, and then the heading operation had to wait until the many thousands of slugs to be headed in the typical run were cut off at such length on the screw machine. If the slug length happened to be imperfect, or if the heading die were to wear during the run, it was of course impossible to vary the slug length during the heading run. All that could be done was to allow the parts to go through the header, and then either shave off excess material or discard parts if they were too bad.

Another problem in connection with such prior art procedure was that the dry lubricant required to be applied to the stock prior to heading could not be present during the cutoff operation on the screw machine. This meant that the lubricant could not be continuously applied to the rod or wire stock, but had to be applied to the individual slugs after they were cut off on the screw machine.

The net result of these difficulties was that prior to the present invention rivet and bolt blanks of tough, modern materials such as titanium 6—4 could only be cut off and headed at about 20 percent of the maximum rate for steel parts, and with much greater difficulty and higher production costs.

Attempts to facilitate the cutting procedure by first heating the stock and then cutting off the slug with a cutoff knife have, prior to the present invention, failed because the slug cooled after the cutting, and tears and breaks resulting from this type of cutting seriously interfered with the subsequent heading operation. Even reheating of the slug after it had been cut off was found not to solve this problem of tears and breaks resulting from cutting off the slug from the hot stock.

Conventional induction coils for this general purpose are open coils which could not be employed within the body of such apparatus as a cold header because too much of the heat from the coil would be dissipated, the frame or body of the apparatus would be likely to become overheated, and there is a substantial danger of shorting out, which can be serious with the heavy currents involved. Since an induction coil has limited current-carrying capacity, any substantial loss of heat to the surrounding environment will seriously impair the efficiency of the induction coil.

Because of these problems, there has, prior to the present invention, been no really satisfactory or efficient combination of an induction-heating coil with a cold header for permitting high speed cutoff and heading of tough modern materials such as 6—4 titanium at a rate of operation comparable to the cutoff and heading of conventional steel stock.

SUMMARY OF THE INVENTION

In view of these and other problems in the art, it is an object of the present invention to provide elongated, tubular induction-heating apparatus for guiding rod or wire stock to a remote and generally inaccessible region and induction heating the stock at said region.

Another object of the invention is to provide an induction-heating unit of the character described which includes an elongated body portion for guiding the rod or wire stock and conducting the induction current, and a forward induction head portion containing the induction coil within which the stock is induction heated immediately before it emerges from the forward end of the unit.

Another object of the invention is to provide an induction-heating unit of the character described wherein the body portion includes outer and inner concentric cylindrical casings of electrically conducting material along which the respective electrical conductors which lead to the induction coil are secured, these outer and inner casings having insulation material therebetween within which the conductors for the coil extend, and the inner tubular casing having a tubular core of insulation material serving as a guideway for guiding the stock through the body of the unit to the forward induction head portion of the unit. These concentric casings serve to effectively isolate the conductors for the coil from the surrounding environment, which may be the steel base or body of apparatus such as a cold header, and also serve to provide greatly extended electrical-conducting areas for the respective conductors which lead to the induction coil, thereby minimizing heat loss to the surrounding environment along the length of the body of the induction unit.

A further object of the invention is to provide a novel combination of a cold header and an elongated induction unit of the character described wherein the body of the induction unit extends from the rear of the header through the base of the header, and the forward induction head of the heating unit is disposed at least in part within the cutoff quill or die so as to provide induction heating of the stock proximate the cutoff location on the header.

A still further object of the invention is to provide such a novel combination of a cold header and an elongated induction-heating unit, wherein the arrangement permits induction heating so close to the cutoff and heading positions of the header that the single induction-heating step satisfactorily prepares the stock for successive cutoff and heading steps in the conventional sequence of a cold header. This combination greatly simplifies and speeds up the cutting off and heading of tough, modern materials, and eliminates the various problems referred to hereinabove that were involved in the prior art procedure of first cutting off the blanks cold on a screw machine, then dry-lubing them, and then heating the slugs by passing them through an open induction coil and immediately heading them, while still hot, in a cold header.

Thus, with the present invention the lubricant can be continuously applied to the rod or wire stock and need not be applied individually to the slugs after they are cut off.

Further, with the present invention the cutoff length can be varied at will during a run to adjust for die wear or to correct for improper initial adjustment, or if desired adjustment can be effected by varying the amount of heat applied to the stock by the induction heating unit immediately prior to cutoff so as to slightly vary the effective length of the blank that is cut off.

With the present invention it is possible to produce headed rivet and bolt blanks made of tough, modern materials such as 6—4 titanium as fast or even faster than from steel. In fact, it has been found that the best grain flow and upset are normally achieved with the present invention when the parts are run at least as fast or even faster than comparable steel parts are conventionally run.

Further objects and advantages of the present invention will appear during the course of the following part of the specification, wherein the details of construction and mode of operation of a presently preferred embodiment are described with reference to the accompanying drawings, in which:

BRIEF DESCRIPTION OF THE DRAWINGS

FIG. 1 is a fragmentary vertical, axial section, with portions in elevation, illustrating a conventional cold header which has been modified to embody an elongated induction-heating unit in accordance with the present invention.

FIG. 2 is a side elevational view, with a portion broken away, showing an elongated induction-heating unit in accordance with the invention.

FIG. 3 is an enlarged side elevational view, partly in section, illustrating the rearward end portion of the induction-heating unit.

FIG. 4 is a side elevational view partly in section, similar to FIG. 3 but illustrating the forward end portion of the induction-heating unit.

FIG. 5 is a fragmentary horizontal section taken on the line 5-5 in FIG. 4, illustrating details of the induction head at the forward end of the induction-heating unit.

FIG. 6 is a cross-sectional view taken on the line 6-6 in FIG. 4.

FIG. 7 is a cross-sectional view taken on the line 7-7 in FIG. 4.

DETAILED DESCRIPTION

Referring to the drawings, and at first particularly to FIG. 1 thereof, an elongated induction-heating unit 10 according to the present invention is there illustrated in combination with a cold header 12 of otherwise generally conventional construction. Wire or rod stock 14 is fed by means of feed rolls 15 from the rear of the header through the induction-heating unit 10 and thence out through the cutoff quill or die for cutoff and heading operations as will hereinafter be described in more detail.

The header 12 includes a heavy cast steel base 16 having front and rear faces 18 and 20, respectively. Positioned against the front face 18 of the base is a hardened die block plate 22, which backs up a die block 24. Mounted within the die block 24 is cutoff quill or die 26 having a front cutoff face 28 along which a cutoff knife 30 moves horizontally. The length of the slug 32 which is cut off at the face 28 of the cutoff quill 26 is determined by a feed stop 34 which is mounted on a suitable support structure 36. The slug 32 is held by pickup fingers 38 and moved thereby in front of a header die 40 in alignment with a knockout pin 42 in the header die, and a ram or gate 44 hits the slug twice to upset and head the slug and thereby provide the headed rivet or bolt blank.

The induction-heating unit 10 is disposed within a bore 46 that extends through the header base 16, plate 22 and into the die block 24, with the rearward end portion of the heating unit 10 projecting rearwardly out of the bore 46 beyond the rear face 20 of the base, and the forward end portion of the heating unit 10 extending into a counterbore 48 in the cutoff quill 26 so that the front end of the heating unit 10 is brought into close proximity to the cutoff face 28 of the quill 26, as for example typically within about one-half inch of the cutoff face 28. The portion of bore 46 that extends through the header base 16 is substantially larger in diameter than the heating unit 10 so as to provide a clearance which assists in minimizing heat transfer between the heating unit 10 and the base 16. The heating unit 10 is coaxially oriented within the bore 46 by means of a pair of spaced guide bushes 50 adjacent the respective front and rear faces 18 and 20 of the base 16, and the heating unit 10 is axially secured in its operative position by means of a setscrew 52 extending through the block and releasably engaging one of the bushes 50.

Electrical conductors 54 and 56 for providing the induction-heating current enter the tubular heating unit 10 proximate the rear end thereof, and rearwardly of the base 16 of the header. These electrical conductors 54 and 56 are tubular conductors for not only carrying the induction-heating current, but also cooling fluid for maintaining the induction coil within reasonable temperature limits despite the heavy induction-heating current that is required.

Referring now to FIGS. 2 to 7 of the drawings, the induction-heating unit 10 generally comprises an elongated body portion 58 and an induction head portion 60 projecting forwardly from the forward end of body portion 58. The body portion 58 includes concentrically arranged cylindrical outer and inner casings 62 and 64, respectively, composed of metal having good electrical conduction properties, as for example copper. Disposed between the outer and inner casings 62 and 64, respectively, is a layer 66 of insulation material such as cotton, Teflon or other suitable insulator, this layer of insulation material assuring proper concentric relative positioning of the casings 62 and 64, and electrically separating the two casings and the flattened tubular conductors extending along the casings as hereinafter described.

Concentrically arranged within the inner tubular casing 64 is a tubular core of insulation material forming the main guideway for the wire or rod stock 14 as it slides through the body portion 58 of the heating unit 10. While any suitable relatively durable insulation material will suffice for the tubular core 68, Teflon has been found to be particularly satisfactory for this purpose because it is a good insulator, is durable and heat resistant, and also has good antifriction characteristics. The tubular core 68 defines the axially arranged feed passage 70 through which the wire or rod stock 14 passes.

The tubular electrical conductor 54 is the "hot" lead, and it has a portion 72 thereof which is flattened in the radial direction of the casings 62 and 64 and is both mechanically and electrically connected to the outer wall of the inner tubular casing 64 as best illustrated in FIG. 6, preferably by means of silver soldering, brazing or the like. Flattening of the conductor 54 in the portion 72 thereof provides good physical and electrical contact with the inner tubular casing 64, and provides satisfactory spacing of the flattened portion 72 from the outer tubular casing 62 without necessitating an unduly large amount of diametrical spacing between the outer and inner casings 62 and 64, respectively. At the same time, the flattened portion 72 of conductor 54 has sufficient internal cross-sectional area to allow a good, free flow of the cooling fluid therethrough.

The tubular conductor 56 is the ground conductor, and likewise has portion 74 thereof which is flattened in the radial direction of the casings 62 and 64 and is mechanically and electrically connected within a slot 76 extending longitudinally along the length of outer tubular casing 62. The flattened portion 74 of conductor 56 is disposed principally within the space between the tubular casings 62 and 64, with one of the flattened sides of the conductor tube generally aligned with the outer tubular casing 62 so as to form a part of the outer tubular casing and avoid any undesirable outward projections from the outer casing 62. The flattened portion 74 of conductor 56 is preferably electrically and mechanically connected to the outer tubular casing 62 by solder or braze seams along the edge of the longitudinal slot 76.

This intimate electrical association of the flattened tube portions 72 and 74 with the respective inner and outer tubular casings 64 and 62 effectively adds the very large electrically conducting surface areas of the casings to the conducting surface areas of the respective flattened tubular conductor portions, so that the electrical resistance along the length of the body portion 58 of the heating unit is greatly minimized, and the result is a minimum of heat generation along the body portion 58 of the heating unit despite the heavy electrical current that is conducted thereby. This, in turn, avoids undesirable power dissipation despite the rather substantial length of the body portion of the heating unit which is required to place the induction head portion 60 of the heating unit in the region of the cutoff quill 26, and avoids any possible overheating in the base of the header. Additionally, the outer tubular casing 62, being grounded, and being electrically separated from the electrically "hot" inner casing 64 and flattened conductor portion 72 by the insulation layer 66, effectively isolates the "hot" electrical portions of the system from the base 16 and die block plate 22 of the header, and avoids any possibility of short circuiting.

The tubular conductors 54 and 56 resume their rounded cross sections in respective forward end portions 78 and 80 forward of the tubular casings 62 and 64. The forward end portions 78 and 80 of the conductors are thereby adapted for connection with the ends of the tubular induction coil 82 which is arranged in axial alignment with the casings 62 and 64 and the tubular core 68.

A tubular core 84 of suitable refractory material capable of withstanding high temperatures is concentrically arranged within the induction coil 82 so as to provide a continuation of the feed passage 70 through the induction core. The tubular core 84 may be composed of a suitable ceramic material, one material which has been found to be satisfactory in being DIAMONITE.

The entire forward induction head portion 60 of the heating unit 10 is then filled to cylindrical shape having the same diameter as the outer tubular casing 62 with a suitable refractory cement 86, the tubular core 84 and a reduced diameter forward end portion 88 of the core 68 providing sizing for the cement 86. The cement portion 86 thus completely encloses the induction coil 82 and the forward end portions 78 and 80 of conductors 54 and 56. For strength and stability of the induction head portion 60 of the unit, this refractory cement 86 is preferably poured for a short distance into the space defined between the outer and inner tubular casings 62 and 64, respectively, as best illustrated in FIG. 4.

The forward end 90 of the unit is preferably ground off to a flat surface normal to the axis of the heating unit immediately forward of the front end of the induction coil 82 so that the induction coil can be positioned as close as possible to the face 28 of the cutoff quill 26, thereby assuring a maximum temperature of the wire or rod stock as it emerges from the cutoff quill 26.

By thus providing the induction heating of the stock closely proximate the cutoff face 28, the stock can be made sufficiently hot to allow for both the cutoff and heading operations to be performed while the metal is in a somewhat plastic state, even with such modern materials as 6—4 titanium and others. Additionally, by heading the slug immediately after it has been cut off in the hot, plastic condition, it has been found that deformations such as tears and breaks which tend to be produced in the cutting operation are removed or reshaped by the heading operation so as to be substantially completely eliminated, despite the fact that such tears or breaks generally spoiled the part in prior art attempts to cut the stock hot where there was substantial cooling between the cutting operation and the heading, which required further heating for heading.

Although I have herein shown and described my invention in what I have conceived to be the most practical and preferred embodiment, it is recognized that departures may be made therefrom within the scope of my invention, which is not to be limited to the details disclosed herein, but is to be accorded the full scope of the claims, so as to embrace any and all equivalent structures and devices.

I claim:

1. In a cold header having a base with a front and a rear and a bore extending therethrough from rear to front, feed means located rearwardly of the base for feeding elongated metal stock forwardly through said bore, cutoff means at the front of the base in alignment with said bore for cutting off slugs from said stock, header means at the front of the base and offset from said cutoff means for heading said slugs, and holding means at the front of the base for sequentially engaging said slugs and moving them from said cutoff means to said header means; the combination with said header of an elongated induction-heating unit having a body portion disposed within said bore and a forward induction head portion with an induction coil therein located in said header adjacent said cutoff means, said heating unit including electrical conductor means connected to said coil and extending rearwardly through the heating unit and out the rear of the base for connection to an electrical source of supply, and tubular core means defining a feed passage extending longitudinally through the heating unit through which said stock is fed to said cut off means, with a forward portion of said feed passage extending coaxially through said coil for induction heating of said stock as it passes therethrough immediately before it is fed to said cutoff means, said body portion of the heating unit comprising outer and inner concentrically arranged tubular casings composed of electrically conducting material, said casings defining an annular space therebetween which is substantially filled with insulation material, said core means comprising a tube of insulation material concentrically arranged within said inner casing, and said conductor means comprising first and second electrical conductors, said first conductor extending longitudinally along the wall of said inner casing substantially within said annular space and being electrically and mechanically connected to said inner casing, and said second conductor extending longitudinally along the wall of said outer casing substantially within said annular space and being electrically and mechanically connected to said outer casing.

2. The combination of claim 1, wherein said conductors and induction coil are tubular so as to carry cooling fluid therethrough, and the portions of said conductors which are coextensive with said casings are flattened in the radial direction of said casings.

3. The combination of claim 2, wherein said outer casing has a longitudinally arranged slot extending through the wall thereof, and said flattened portion of said second conductor is disposed in said slot with the outer flattened wall portion of said second conductor substantially filling said slot so as to be generally continuous with the wall of the outer casing.